United States Patent
Koga et al.

[11] Patent Number: 6,047,256
[45] Date of Patent: Apr. 4, 2000

[54] DEVICE FOR GENERATING A REFERENCE PATTERN WITH A CONTINUOUS PROBABILITY DENSITY FUNCTION DERIVED FROM FEATURE CODE OCCURRENCE PROBABILITY DISTRIBUTION

[75] Inventors: Shinji Koga; Takao Watanabe; Kazunaga Yoshida, all of Tokyo, Japan

[73] Assignee: NEC Corporation, Tokyo, Japan

[21] Appl. No.: 08/077,506

[22] Filed: Jun. 17, 1993

Related U.S. Application Data

[63] Continuation of application No. 07/704,717, May 20, 1991, which is a continuation of application No. 07/308,277, Feb. 9, 1989, abandoned.

[30] Foreign Application Priority Data

Feb. 9, 1988 [JP] Japan ................................. 63-29450

[51] Int. Cl.$^7$ ................................................. G10L 15/14
[52] U.S. Cl. ............................................................. 704/256
[58] Field of Search ........................ 381/41–45; 395/2.4, 395/2.45, 2.49, 2.6, 2.64, 2.65

[56] References Cited

U.S. PATENT DOCUMENTS

| | | | |
|---|---|---|---|
| 4,783,804 | 11/1988 | Juang et al. ................................. | 395/2 |
| 4,803,729 | 2/1989 | Baker ........................................ | 381/43 |
| 4,805,219 | 2/1989 | Baker et al. .............................. | 381/43 |
| 4,829,577 | 5/1989 | Kuroda et al. ............................ | 381/45 |

OTHER PUBLICATIONS

Webster's Ninth New Collegiate Dictionary, Merriam–Webster, Inc., 1986, p. 806.

The Bell System Technical Journal, "An Introduction to the Application of the Theory of Probabilistic Functions of a Markov Process to Automatic Speech Recognition" by S. Levinson, et al. Apr. 1983 pp. 1035–1074.

*Primary Examiner*—David D. Knepper
*Attorney, Agent, or Firm*—Sughrue, Mion, Zinn, Macpeak & Seas, PLLC

[57] ABSTRACT

In a system for recognizing a time sequence of feature vectors of a speech signal representative of an unknown utterance as one of a plurality of reference patterns, a generator (11) for generating the reference patterns has a converter (15) for converting a plurality of time sequences of feature vectors of an input pattern of a speech signal with variances to a plurality of time sequences of feature codes with reference to code vectors (14) which are previously prepared by the known clustering. A first pattern former (16) generates a state transition probability distribution and an occurrence probability distribution of feature codes for each state in a state transition network. A function generator (17) calculates parameters of continuous Gaussian density function from the code vectors and the occurrence probability distribution to produce the continuous Gaussian density function approximating the occurrence probability distribution. A second pattern former (18) produces a reference pattern defined by the state transition probability distribution and the continuous Gaussian density function. For a plurality of different training words, a plurality of reference patterns are generated and are memorized in the reference pattern generator.

5 Claims, 1 Drawing Sheet

DEVICE FOR GENERATING A REFERENCE PATTERN WITH A CONTINUOUS PROBABILITY DENSITY FUNCTION DERIVED FROM FEATURE CODE OCCURRENCE PROBABILITY DISTRIBUTION

This a Continuation of application Ser. No. 07/704,717 filed on May 20, 1991 which is a continuation of application Ser. No. 07/308,277 filed on Feb. 9, 1989 now abandoned.

BACKGROUND OF THE INVENTION

1) Field of the Invention

This invention relates to a speech recognition system and, in particular, to a device for producing a reference pattern for use in the system.

2) Description of the Prior Art

In speech recognition systems, a speech signal having a pattern is analyzed by a feature analyzer to produce a time sequence of feature vectors. The time sequence of feature vectors is compared with reference patterns and is thereby identified as one of the reference patterns.

Considering variation of the pattern of the speech signal due to a plurality of utterances, the reference pattern is generated from a number of training speeches.

One of the known speech recognition systems has a table memorizing a plurality of code vectors and a plurality of feature codes corresponding thereto for vector quantizing the time sequence of feature vectors. For example, such a speech recognition system using the table is described in an article contributed by S. E. Levinson, L. R. Rabiner, and M. M. Sondhi to the Bell System Technical Journal, Volume 62, No. 4 (April 1983), pages 1035 to 1074, under the title of "An Introduction to the Application of the Theory of Probabilistic Functions of a Markov Process to Automatic Speech Recognition".

According to the Levinson et al article, the speech recognition system comprises the code vector table for memorizing a plurality of code vectors and a plurality of feature codes corresponding thereto.

On generating the reference pattern, a plurality of speech signals are used which are produced by a plurality of utterances and are representative of the predetermined input pattern with variations. Connected to the feature analyzer and to the code vector table, a converter is used in converting the plurality of feature vector time sequences into a plurality of time sequences of feature codes, respectively, with reference to the code vectors. A forming circuit is connected to the converter and has a state transition network or table.

The state transition network has a plurality of states which vary from one to another with a state transition probability in accordance with time elapsing. Therefore, for the feature code time sequences, the feature codes appear in each state in the state transition network. When attention is directed to a particular code among the feature codes, the particular code has a probability of occurrence in each state in the transition network.

The forming circuit is responsive to the feature code time sequences and calculates the state transition probability distribution and the occurrence probability distribution of the feature codes for each state to generate a reference pattern comprising both probability distributions.

In the Levinson et al speech recognition system, the reference pattern is generated in this manner in response to each predetermined input pattern by a reference pattern generating device which comprises the code vector table, the converter, and the forming circuit. The reference pattern generating device is rapidly operable because the reference pattern can be obtained with relatively little calculation processing. The reference pattern is, however, liable to cause erroneous speech recognition because of quantizing error.

Another speech recognition system is disclosed in U.S. Pat. No. 4,783,804 issued to Biing-Hwan Juang et al. According to the Juang et al patent, a reference pattern generating device comprises a speech analyzer and a function generator. The speech analyzer produces a plurality of feature vector time sequences representative of a predetermined input pattern of a plurality of varieties. A function generator is coupled to the speech analyzer and calculates, in response to the feature vector time sequences, a state transition probability distribution in the state transition network and a probability density function by which it is possible to approximate a probability distribution of occurrence of the feature vectors for each state. The function generator generates a reference pattern in response to the state transition probability distribution and the probability density function.

The Juang et al reference pattern generating device can generate the reference pattern which enables speech recognition with reduced error because no vector quantization is used. The device is, however, incapable of rapidly generating the reference pattern because the processing is increased for calculating the reference pattern.

SUMMARY OF THE INVENTION

It is an object of the present invention to provide a reference pattern generating device which is capable of rapidly generating the reference pattern which enables speech recognition with reduced errors.

It is another object of the present invention to provide a speech recognition system which is capable of rapidly recognizing speech with little error.

As described above, a reference pattern generating device includes a feature analyzer responsive to a speech signal representative of an input pattern for producing a time sequence of feature vectors representative of the input pattern; a table for storing a plurality of code vectors and a plurality of feature codes corresponding thereto; converting circuitry connected to the feature analyzer and the table for converting a plurality of time sequence of feature vectors to a plurality of time sequence of feature codes with reference to the table, a plurality of the time sequences of the feature vectors being produced in response to a plurality of speech signals including the first-mentioned speech signal; and first forming means for forming, in response to a plurality of the time sequence of the feature codes, a state transition probability in a state transition network and a probability density distribution of occurrence of the feature codes in each state in the state transition network. According to the present invention, the reference pattern generating device includes function generating circuitry connected to the table and the first forming circuitry for generating a probability density function approximating the probability distribution with the code vectors used as parameters in the function; and second forming circuitry connected to the first forming circuitry and the function generating circuitry for forming a reference pattern for a plurality of the speech signals, the reference pattern being defined by the state transition probability distribution and the probability density function.

According to an aspect of the present invention, the function generating circuitry generates as the probability density function a Gaussian probability density function which is expressed by:

$$f(x) = \left(1/\sqrt{2\pi\sigma^2}\right)e^{-(x-\mu)^2/2\sigma^2},$$

where $\mu$ and $\sigma^2$ are a mean value and a covariance, respectively, the function generating circuitry calculating the mean value and the covariance in accordance with the following equations:

$$\mu = \sum_{i=1}^{I} R_i \cdot b_{pi}, \text{ and}$$

$$\sigma^2 = \sum_{i=1}^{I} (R_i - \mu)^2 \cdot b_{pi}.$$

where $R_i$ is the code vectors, $b_{pi}$ being the feature code occurrence probabilities, I being a number of the code vectors.

In a speech recognition system of the reference pattern generating device, a feature vector time sequence representative of an unknown speech signal is directly compared with the reference patterns without being converted into a feature code time sequence so as to recognize the speech signal as one of the reference pattern.

DESCRIPTION OF THE PREFERRED EMBODIMENT

Figure 1:
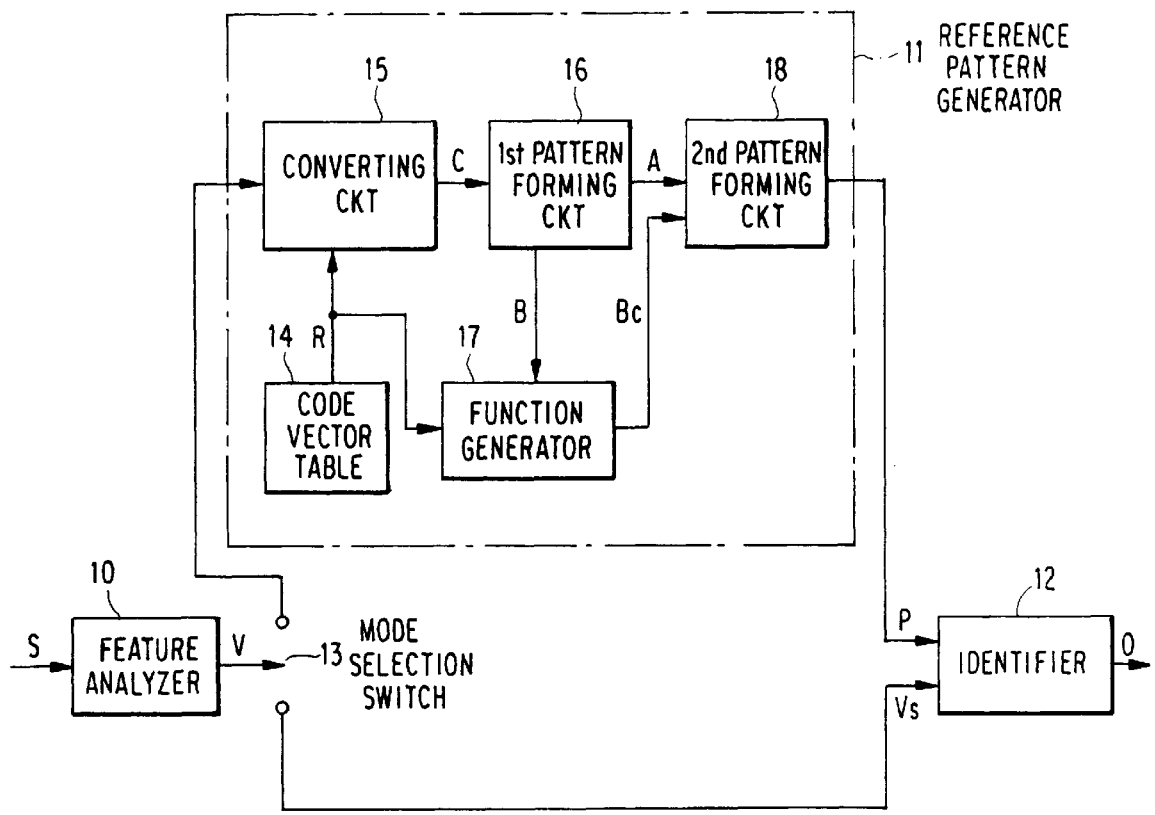
FIG. 1 is a block diagram view of a speech recognition system according to an embodiment of the present invention.

Referring to FIG. 1, a speech recognition system shown therein comprises a feature analyzer 10 for analyzing an input pattern of a speech signal to produce a time sequence of feature vectors representative of the input pattern, a reference pattern generator 11 for generating and memorizing patterns of training speeches as reference patterns, an identifier 12 for comparing a time sequence of feature vectors of a speech signal of an unknown utterance with the reference patterns to identify the utterance, and a mode selection switch 13 for selectively connecting the feature analyzer 10 to the reference pattern generator 11 and the identifier 12.

The feature analyzer 10 analyzes an input pattern of an incoming speech signal S due to an utterance by a known analyzing method, such as, the melcepstrum or the linear prediction coding and produces a time sequence of feature vectors V. The time sequence of feature vectors V is represented by:

$$V = \{V_1, V_2, V_3, \ldots V_t, \ldots, V_T\},$$

where $V_t$ represents a feature vector at a time instant t and T represents an entire time duration of the incoming speech signal. Each of feature vectors $V_t$ is an N-order vector and is represented by:

$$V_t = \{V_{t1}, V_{t2}, V_{t3}, \ldots V_{tn}, \ldots, V_{tN}\}.$$

The mode selection switch 13 is switched to the reference pattern generator 11 during a training mode. Accordingly, the time sequence of feature vectors V is applied to the reference pattern generator 11 from the feature analyzer 10 through the mode selection switch 13. The time sequence of feature vectors V represents an input pattern of a training speech.

The reference pattern generator 11 comprises a code vector table 14 for memorizing a plurality of code vectors and a plurality of feature codes corresponding thereto, a converting circuit 15 for converting the time sequence of feature vectors V into a time sequence of feature codes with reference to the code vector table 14, a first pattern forming circuit 16 responsive to a plurality of time sequences of feature codes for forming a first pattern comprising a state transition probability distribution and a probability distribution of occurrence of the feature codes for each state in a state transition network, a function generator 17 for generating an approximate continuous probability density function from the probability distribution of occurrence of the feature codes with reference to the code vector table 14, and a second pattern forming circuit 18 for forming a second pattern which comprises the state transition probability distribution and the approximate continuous probability density function and holding the second pattern as the reference pattern. The approximate continuous probability density function is a probability density function approximate to the probability distribution of occurrence of the feature codes in each state in the state transition network.

The code vector table 14 memorizes a plurality of code vectors R $(=\{R_1, R_2, R_3, \ldots, R_i, \ldots, R_I\}$, where I is a number of code vectors). Each of code vectors $R_i$ is represented by:

$$R_i = \{r_{i1}, r_{i2}, r_{i3}, \ldots, r_{in}, \ldots, r_{iN}\}.$$

Each of these code vectors R is previously prepared from iterative utterance of a different known vocabulary by the known clustering. Then, a feature code is determined for each of the code vectors R.

The code vector table 14 also memorizes a plurality of feature codes corresponding to the code vectors, respectively.

The converting circuit 15 receives the time sequence of feature vectors V from the feature analyzer 10 and detects likelihood of the time sequence of feature vectors V and the code vectors R. The detection of likelihood is effected by use of one of the known likelihood detecting methods. In the present embodiment, a method is used where the square distance D is detected between each of the feature vectors $V_t$ and each of code vector $R_i$ as follows:

$$D = \sum_{n=1}^{N} (V_{tn} - r_{in})^2.$$

Then, an optimum code vector $R_i$ is detected as a specific code vector which makes the square distance D minimum, and a specific one of the feature codes $c_i$ is obtained in correspondence to the optimum code vector $R_i$. Thus, the feature vector $V_t$ is converted into the specific feature code $c_i$. Similar conversion is effected for all of feature vectors V and a time sequence of feature codes C is obtained for the time sequence of feature vectors V. The time sequence of feature codes C is represented by:

$$C = \{c_{i1}, c_{i2}, c_{i3}, \ldots, c_{iT}\}.$$

The time sequence of feature codes C is applied to the first pattern forming circuit 16.

A similar process is repeated by a predetermined time number for iterative utterance of the same known training vocabulary. When the utterance is repeated K times, K time sequences of feature codes are obtained. The K times sequences of feature codes are represented by $C_1, C_2, C_3, \ldots, C_K$, respectively, and are collectively represented by $C_k$ ($1 \leq k \leq K$).

The first pattern forming circuit 16 has the state transition network or table. The first pattern forming circuit 16 receives the K time sequences of feature codes $C_k$ and carries out extrapolation of an optimum state transition probability distribution A and a probability distribution B of occurrence of the feature codes for each state in the state transition network from $C_k$ by the Baum-Welch algorithm.

The state transition probability distribution A and the feature code occurrence probability distribution B are represented by:

$$A = \{A_1, A_2, A_3, \ldots, A_p, \ldots, A_P\} \text{ and}$$

$$B = \{B_1, B_2, B_3, \ldots, B_p, \ldots, B_P\}$$

respectively. The parameter $\mu$ is a mean vector $\sigma^2$ and the parameter is a diffusion vector. P is a number of states. Assuming that $A_1, A_2, A_3, \ldots, A_p, \ldots$, and $A_P$ are collectively represented by $A_p$ and $B_1, B_2, B_3, \ldots, B_p, \ldots$, and $B_P$ are collectively represented by $B_p$ ($1 \leq p \leq P$), $A_p$ and $B_p$ are given by:

$$A_p = \{a_{p1}, a_{p2}, a_{p3}, \ldots, a_{pQ}\} \text{ and}$$

$$B_p = \{b_{p1}, b_{p2}, b_{p3}, \ldots, b_{pI}\},$$

respectively. Q is a number of states to which transition is possible from the state p. Accordingly, $a_{pq}$ ($1 \leq q \leq Q$) represents a transition probability from the state p to q states. While, $b_{pi}$ ($1 \leq i \leq I$) represents an occurrence probability of the feature code $R_i$ in the state p.

Thus, a first pattern is formed which comprises the state transition probability distribution A and the feature code occurrence probability distribution B.

The state transition probability distribution A is applied to the second pattern forming circuit 18 from the first pattern forming circuit 16 while the feature code occurrence probability distribution B is applied to the function generator 17.

The function generator 17 produces the approximate continuous probability density function from the feature code occurrence probability distribution B with reference to code vectors R in the code vector table 14.

The Gaussian probability density function and the Poisson probability density function can be used as the approximate continuous probability density function.

In the present embodiment, the Gaussian probability density function is used. The Gaussian probability density function is represented by:

$$f(x) = \left(1 / \sqrt{2\pi\sigma^2}\right) e^{-(x-\mu)^2/2\sigma^2}.$$

Parameters $\mu$ and $\sigma^2$ are a mean value and a covariance, respectively. In the embodiment, the mean value and the covariance are ones of the code vectors R. Therefore, those parameters $\mu$ and $\sigma^2$ are obtained by the following equations:

$$\mu = \sum_{i=1}^{I} R_i \cdot b_{pi}, \text{ and}$$

$$\sigma^2 = \sum_{i=1}^{I} (R_i - \mu)^2 \cdot b_{pi}.$$

$R_i$ is read from the code vector table 14 and $b_{pi}$ is given by the feature code occurrence probability distribution B.

Thus, the function generator 17 produces the approximate continuous probability density function Bc which is applied to the second pattern forming circuit 18.

The second pattern forming circuit 18 receives the state transition probability distribution A from the first pattern forming circuit 16 and the approximate continuous probability density function Bc from the function generator 17 and combines them to form a second pattern. The second pattern forming circuit 18 stores the second pattern as the reference patter P in the memory device. In the recognition mode, the reference pattern P is read out of the memory device in the second pattern forming circuit 18 in the manner which will later become clear.

Reference patterns are generated and memorized for different training speeches in the similar manner as described above.

In the recognition mode, the mode selection switch 13 is switched to the identifier 12.

The feature analyzer 10 receives the speech signal S due to an unknown utterance and produces the time sequence of feature vectors V as Vs. The time sequence of feature vectors Vs is applied to the identifier 12 through the mode selection switch 13.

Figure 2:
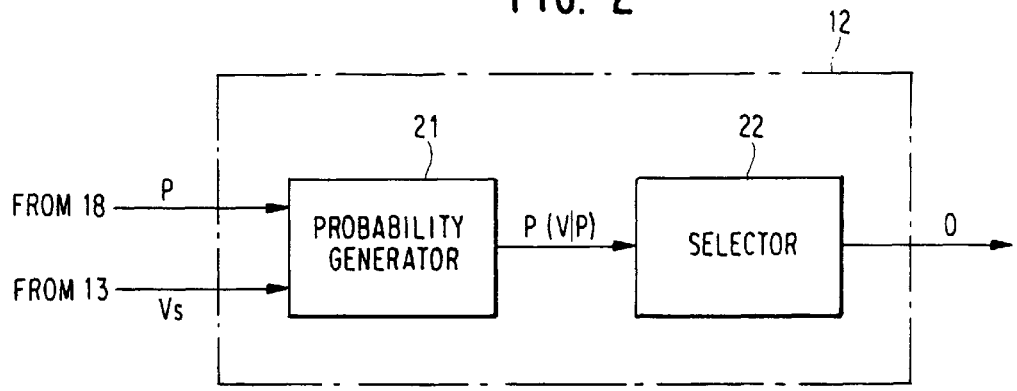
FIG. 2 is a block diagram view of an identifier in the speech recognition system of FIG. 1.

Referring to FIG. 2, the identifier 12 comprises a probability generator 21 and a selector 22.

The probability generator 21 is connected to the second pattern forming circuit 18 and the feature analyzer 10. The probability generator 21 reads the reference patterns P successively from the second pattern forming circuit 18 and generates occurrence probabilities P(V|P) of the time sequence of feature vectors Vs for all of the reference patterns P. Each of the probability P(V|P) can be calculated by use of the Viterbi algorithm with the dynamic programming technique or the Forward-Backward algorithm.

What is claimed is:

1. A reference pattern generating device including:
   a feature analyzer, responsive to a speech signal representative of an input pattern, for producing a time sequence of feature vectors representative of said input pattern; a table storing a plurality of code vectors of known vocabulary and a plurality of feature codes respectively corresponding to said plurality of code vectors; converting means, connected to said feature analyzer and said table, for converting a plurality of time sequences of feature vectors to a plurality of time sequences of feature codes with reference to said table, said plurality of time sequences of feature vectors being produced in response to a plurality of speech signals; and first forming means for forming, in response to said plurality of time sequences of feature codes, a state transition probability in a state transition network and a probability distribution of occurrence of the feature codes in each state in said state transition network;
   where the improvement comprises:
   function generating means, connected to said table and said first forming means, for generating an approximate continuous probability density function, said approximate continuous probability density function approximating said probability distribution of occurrence of the feature codes in each state in said state transition network, said code vectors being used as parameters in said approximate continuous probability density function; and second forming means, connected to said first forming means and said function generating means, for forming as a reference pattern for said plurality of speech signals a combination of said state transition probability distribution and said approximate continuous probability density function.

2. A device as claimed in claim 1, said function generating means generates as the approximate continuous probability density function a Gaussian probability density function which is expressed by:

$$f(x) = \left(1 / \sqrt{2\pi\sigma^2}\right) e^{-(x-\mu)^2/2\sigma^2},$$

where $\mu$ and $\sigma^2$ are a mean value and a covariance, respectively, said function generating means calculating the mean value and the covariance in accordance with the following equations:

$$\mu = \sum_{i=1}^{I} R_i \cdot b_{pi}, \text{ and}$$

$$\sigma^2 = \sum_{i=1}^{I} (R_i - \mu)^2 \cdot b_{pi}.$$

where $R_i$ is said code vectors, $b_{pi}$ being the feature code occurrence probabilities, I being a number of said code vectors.

3. A speech recognition system for recognizing speech, the system comprising:

a feature analyzer responsive to a speech signal representative of an input pattern for producing a time sequence of feature vectors representative of said input pattern;

mode selection switch means for selecting one of a training mode and a recognition mode;

reference pattern generating means being coupled with said feature analyzer through said mode selection switch means during selection of said training mode and for generating and storing a plurality of reference patterns;

said reference pattern generating means comprising:

a table storing a plurality of code vectors of known vocabulary and a plurality of feature codes respectively corresponding to said plurality of code vectors;

converting means, connected to said feature analyzer and said table, for converting a plurality of time sequences of feature vectors to a plurality of time sequences of feature codes with reference to said table, said plurality of time sequences of feature vectors being produced in response to a plurality of speech signals;

first forming means for forming, in response to said plurality of time sequences of feature codes, a first pattern comprising a state transition probability in a state transition network and a probability distribution of occurrence of the feature codes in each state in said state transition network;

function generating means, connected to said table and said first forming means, for generating an approximate continuous probability density function, said approximate continuous probability density function approximating said probability distribution of occurrence of the feature codes in each state in the state transition network, said code vectors being used as parameters in said approximate continuous probability density function; and second forming means, connected to said first forming means and said function generating means, for forming as a second pattern for said plurality of speech signals, a combination of said state transition probability and said approximate continuous probability density function, said second forming means storing said second pattern as one of said plurality of reference patterns; and identifying means connected to said second forming means and connected to said feature analyzer through said mode selection switch means when recognizing an unknown speech signal during selection of said recognition mode, said identifying means reading said reference patterns from said second forming means, in response to an identifying time sequence of feature vectors representative of said unknown speech signal as the time sequence of feature vectors from said feature analyzer, to identify said identifying time sequence of feature vectors as one of said reference patterns in said second forming means.

4. A system as claimed in claim 3, wherein said identifying means comprises:

generating means coupled with said second forming means and said feature analyzer and responsive to said identifying time sequence of feature vectors for reading said reference patterns from said second forming means and generating an occurrence probability of said identifying time sequence of feature vectors for each of the reference patterns; and selecting means coupled with said generating means for selecting a specific one of the reference patterns which makes the occurrence probability maximum to produce said specific reference pattern as an identifying output.

5. A speech recognition system comprising:

analyzing means responsive to a speech signal representative of an input pattern for producing a time sequence of feature vectors representative of said input pattern;

mode selection switch means for selecting one of a training mode and a recognition mode;

reference pattern generating means coupled with said analyzing means through said mode selection switch means when said training mode is selected and for generating and storing a plurality of reference patterns;

said reference pattern generating means comprising:

a code vector table storing a plurality of code vectors of known vocabulary and a plurality of feature codes respectively corresponding to said plurality of code vectors;

converting means connected to said analyzing means and said code vector table for converting a plurality of time sequences of feature vectors to a plurality of time sequences of feature codes with reference to said table;

first pattern forming means for receiving said plurality of time sequences of feature codes and generating therefrom a first pattern comprising a state transition probability in a state transition network and a probability distribution of occurrence of the feature codes in each state in said state transition network;

function generating means connected to said table and said first pattern forming means for generating an approximate continuous probability density function, said approximate continuous probability density function approximating said probability distribution of occurrence of the feature codes in each state in the state transition network, said code vectors being used as parameters in said approximate continuous probability density function; and second pattern forming means, connected to said first pattern forming means and said function generating means, for forming a reference pattern by storing each state transition probability with a corresponding approximate continuous probability density function; and identifying means connected directly to said second pattern forming means and connected to said analyzing means through said mode selection switch means when recognizing an unknown speech signal during a recognition mode, said identifying means reading said reference patterns from said second forming means, in response to an identifying time sequence of feature vectors representative of said unknown speech signal as the time sequence of feature vectors from said analyzing means, to identify said identifying time sequence of feature vectors as one of said reference patterns stored in said second forming means, wherein said approximate continuous probability density function is only calculated while in the training mode.

* * * * *

UNITED STATES PATENT AND TRADEMARK OFFICE
CERTIFICATE OF CORRECTION

PATENT NO. : 6,047,256
DATED : April 4, 2000
INVENTOR(S) : Shinji Koga; Takao Watanabe; Kazunaga Yoshida Page 1 of 1

It is certified that error appears in the above-identified patent and that said Letters Patent is hereby corrected as shown below:

Column 2,
Line 51, delete "means" insert -- circuitry --

Column 5,
Line 45 after " function" insert -- Bc--
Line 48 after "function" insert -- Bc--
Line 60 after "respectively" insert -- the parameter U is a mean vector $\sigma^2$ and the parameter is a diffusion vector --

Column 6,
Line 15, after "pattern" insert -- using a Gaussian density function as a probability density function, the probability density function is defined by the mean vector and the diffusion vector. Therefore, the approximate continuous probability density function Bc is defined by parameters $\mu$ and $\sigma$. The second pattern foaming circuit 18 memorizes the transition probability distribution A and the approximate continuous probability density function Bc as the reference pattern P. The reference pattern P represents the state transition network, the same as the first pattern generated by the first pattern forming circuit 16. Therefore, a pair of parameters is defined by the transition probability distribution A and the approximate continuous probability density function Bc at the state transition network.
Line 17, delete "patter" insert -- pattern --.

Signed and Sealed this

Fourth Day of September, 2001

Attest:

*Nicholas P. Godici*

NICHOLAS P. GODICI
*Attesting Officer*  *Acting Director of the United States Patent and Trademark Office*